United States Patent [19]

Bartholet

[11] 4,165,636
[45] Aug. 28, 1979

[54] METHOD AND MEANS FOR MEASURING PRELOADS IN ASSEMBLED MECHANISMS

[75] Inventor: Stephen J. Bartholet, Orange, Calif.

[73] Assignee: Odetics, Inc., Orange, Calif.

[21] Appl. No.: 879,119

[22] Filed: Feb. 21, 1978

Related U.S. Application Data

[63] Continuation-in-part of Ser. No. 774,265, Mar. 4, 1977, abandoned.

[51] Int. Cl.² ............................................. G01L 1/00
[52] U.S. Cl. ................................................ 73/141 R
[58] Field of Search ............... 73/9, 140, 141 R, 88 F, 73/58, 60, 101; 116/DIG. 34; 85/62

[56] References Cited

U.S. PATENT DOCUMENTS

| | | | |
|---|---|---|---|
| 2,887,876 | 5/1959 | Frankel et al. | 73/141 R X |
| 2,888,825 | 6/1959 | Krafft | 73/139 |
| 3,535,911 | 10/1970 | Armstrong et al. | 73/9 |
| 3,791,210 | 2/1974 | Taylor | 73/143 |
| 3,882,719 | 5/1975 | Fletcher et al. | 73/143 |

OTHER PUBLICATIONS

L. C. Towle—"Shear-Strength & Friction Measurement on Thin Layers Under High Pressure,"—Journal of Applied Physics—vol. 42, No. 6, May 1971, pp. 2368-2376.

*Primary Examiner*—Charles A. Ruehl
*Attorney, Agent, or Firm*—Philip M. Hinderstein

[57] ABSTRACT

A method and means for determining the amount of compressional load in an assembly of clamped elements by measuring the friction between adjacent elements in the assembly. A rotatable element is positioned between two non-rotatable elements within the assembly and the torque necessary to rotate the rotatable element is measured. By measuring or calculating the torque necessary to rotate the rotatable element with a known compressional load, the relationship between torque and compressional load can be established whereby comparison of a measured torque with the established relationship permits conversion of any measured torque to compressional load in applications where element surface coefficients of friction do not change appreciably.

11 Claims, 4 Drawing Figures

METHOD AND MEANS FOR MEASURING PRELOADS IN ASSEMBLED MECHANISMS

CROSS-REFERENCE TO RELATED APPLICATION

This application is a continuation-in-part of my co-pending application serial No. 774,265, filed Mar. 4, 1977, now abandoned.

BACKGROUND OF THE INVENTION

1. Field of the Invention

The present invention relates to a method and means for measuring preloads in assembled mechanisms and, more particularly, to a simple and accurate technique for measuring the amount of compressional load in an assembly of clamped elements without unloading or disturbing the load.

2. Description of the Prior Art

In a wide variety of mechanical mechanisms, it is necessary to assemble a plurality of elements so as to place such elements under a known compressional load, i.e., a preload. For example, in the case of a rolling element bearing assembly for use in a precision machine, it is common to place the bearings under a given preload. This is necessary for a variety of reasons. That is, if there is no load on the bearing, the bearing races are free to move relative to each other and this permits lateral movement of the rolling elements axis. Since the rolling element is typically functioning to guide a moving part, lateral movement of the rotating element axis introduces inaccuracies in its guiding function. Furthermore, the absence of a preload in a bearing assembly can cause undue wear and premature failure of the bearing. In addition, if the machine in which the bearing is assembled vibrates, an impact load is added to the bearing which shortens the useful life thereof.

A preload effectively solves the above problems by eliminating "play" from the rotating member, reducing wear factors on the bearing be required to drive a driven element. With the correct preload, two bearings are placed in opposition to each other within the assembled mechanism to maintain regidity of the supported member.

In the past, it has been difficult, if not impossible, from a practical standpoint, to measure the preload within an assembled mechanism, such as a rolling element bearing assembly, and even more difficult to measure the preload without disturbing the assembly. One prior solution is the use of matched bearing pairs. This involves manufacturing a pair of bearings with dimensions that result in a predetermined deflection in each bearing as they are clamped together. This deflection, along with the spring rate of the bearings, determines the preload within the assembly.

This method is convenient and is widely used. However, it is inaccurate at low preloads, requires extremely precise spacers if the bearings are to be located apart from each other, does not allow changing the preload once the parts are manufactured, and the resulting preload cannot easily be measured.

Another prior art solution involves measuring the deflections of the bearings as the parts are assembled. How far a threaded retainer is tightened or how many shims are installed is determined by the deflection measurement. This method is also widely used. However, it too is inaccurate at low preloads, requires extremely precise deflection measurements, and the resulting preload cannot easily be measured after the mechanism is assembled.

Another prior art solution involves the use of a low rate spring in the preload path. Changes in preload results in large spring deflections which can easily be measured with a calipers or even a ruler. Unfortunately, external forces need only be as high as the bearing preload to cause compression of the spring and large shifts in position of the rotating member.

SUMMARY OF THE INVENTION

According to the present invention, there is provided a method and means for measuring preloads in assembled mechanisms which solves these problems in a manner unknown heretofore. The present method and means is not only simple and accurate, but permits the measurement of a large range of preloads within an assembly of clamped elements, such as a bearing system. With the present method and means, the preload can be measured not only during, but after assembly. The preload can be readily changed once the parts are manufactured. Low rate springs in the preload path are also not required. The preload measurement may be made without unloading or disturbing the preload and may be made while the bearing system is in operation. Furthermore, the preload can be measured while the bearing assembly is being subjected to various environments such as temperature changes. The preload measurement requires a minimum of operator skill compared to previous measurement techniques. Accurate performance of this invention is, however, limited to those applications where changes in coefficients of friction due to contamination or material degradation are not significant factors, as is often the case.

Briefly, the present method and means for determining the amount of compressional load in an assembly of clamped elements involves the measurement of the friction between adjacent elements in the assembly. A rotatable element is positioned between two non-rotatable elements within the assembly and the torque necessary to rotate the rotatable element is measured. By measuring or calculating the torque necessary to rotate the rotatable element with a known compressional load, the relationship between torque and compressional load can be established whereby comparison of a measured torque with the established relationship permits conversion of any measured torque to compressional load. It is preferable that all friction torque measurements be dynamic, that is, with the rotatable element in continuous motion. This is because static, or breakaway, friction may be influenced by random matching of microscopic surface anomalies between the clamped elements, while dynamic friction measurements provide a repeatable average based on the entire surface.

OBJECTS

It is therefore an object of the present invention to provide a method and means for measuring preloads in assembled mechanisms.

It is a further object of the present invention to provide a simple and accurate technique for measuring the amount of compressional load in an assembly of clamped elements without unloading or disturbing the preload.

It is a still further object of the present invention to permit the measurement of any magnitude of preload within an assembled mechanism without introducing undesirable system characteristics.

It is another object of the present invention to permit preload measurements while an assembled mechanism is operating.

It is still another object of the present invention to provide a method and means for measuring preloads in assembled mechanisms which requires a minimum of operator skill compared to previous measurement techniques.

Another object of the present invention is the provision of a method and means whereby preloads can be measured while an assembled mechanism is being subjected to various environments, such as temperature changes.

Still another object of the present invention is the provision of a method and means for measuring preloads in assembled mechanism which permits the preload to be readily changed once the mechanism is manufactured.

An additional object of the present invention is the provision of a method and means for measuring preloads in assembled mechanisms which is accurate, especially at low preloads.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

DESCRIPTION OF THE PREFERRED EMBODIMENT

Figure 1:
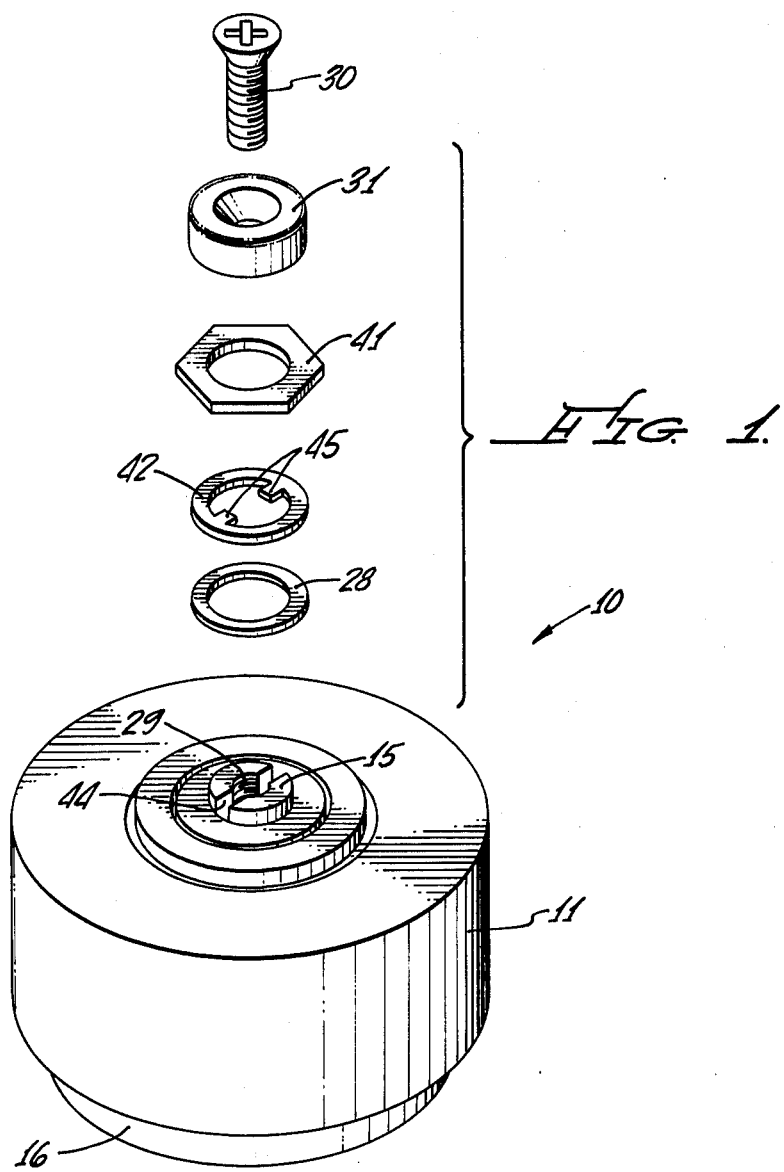
FIG. 1 is an exploded perspective view of a rolling element and bearing assembly modified to incorporate the present method and means for measuring preloads.
Figure 2:
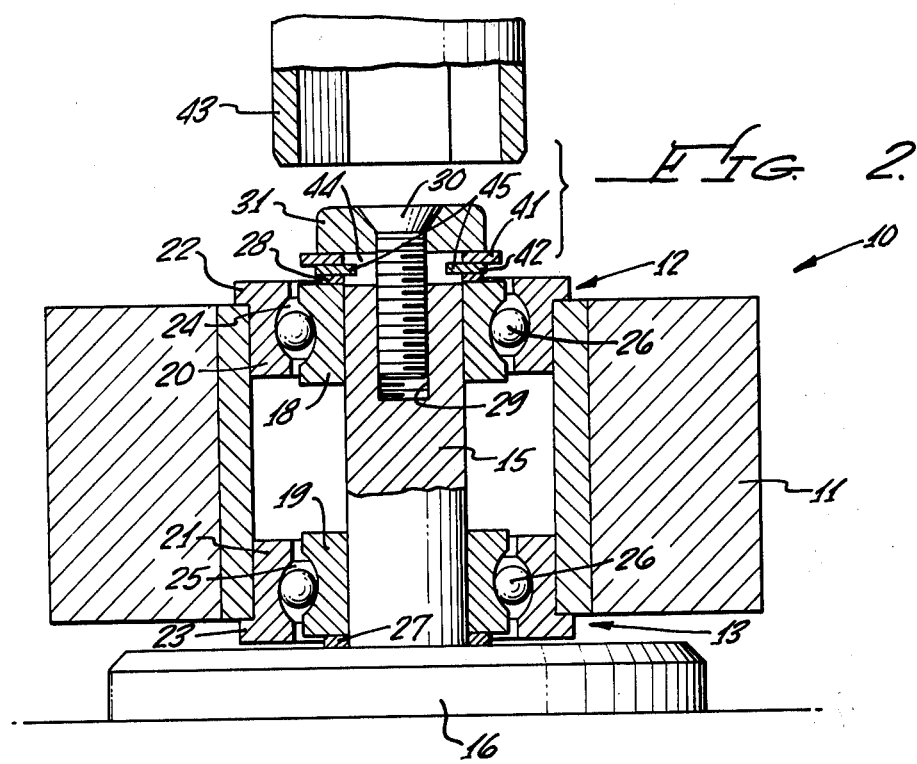
FIG. 2 is a longitudinal sectional view through the axis of the rolling element and bearing assembly of FIG. 1.

Referring now to the drawings and, more particularly, to FIGS. 1 and 2, thereof, there is shown an example of an assembly of clamped elements, generally designated 10, including a rolling element 11 and pair of identical bearing assemblies 12 and 13. However, while the present invention will be described in its preferred embodiment as being applied to the measurement of the preload in bearing assemblies 12 and 13, it will be obvious to those skilled in the art that the present method and means is equally applicable for determining the amount of compressional load in any assembly of clamped elements.

Assembly 10 includes a central shaft 15 which is mounted on and extends perpendicular to a base 16. Bearing assemblies 12 and 13 surround shaft 15 and include inner races 18 and 19, respectively, and outer races 20 and 21, respectively. Outer races 20 and 21 have outwardly extending lips 22 and 23, respectively, between which is positioned roller 11.

Inner races 18 and 19 have circumferential grooves in the outer surfaces thereof and outer races 20 and 21 have circumferential grooves in the inner surfaces thereof to form raceways 24 and 25 in bearing assemblies 12 and 13, respectively, for receipt of a plurality of ball bearings 26. Ball bearings 26 permit rotation of outer races 20 and 21 and roller 11 relative to inner races 18 and 19, respectively, which remain stationary relative to shaft 15.

To assemble roller 11 and bearing assemblies 12 and 13 on shaft 15, one or more washers/spacers/shims 27 are positioned on shaft 15, against base 16, to space bearing assembly 13 from base 16. After the assembled configuration of roller 11 and bearing assemblies 12 and 13 are positioned over shaft 15, one or more washers/spacers/shims 28 are placed over shaft 15 so as to engage inner race 18 of bearing assembly 12. The upper end of shaft 15 has an internally threaded axial bore 29 therein which receives a bolt 30. A retainer 31 is positioned in contact with the upper end of shaft 15 and is secured to such upper end by bolt 30 which passes therethrough.

As will be evident to those skilled in the art, tightening of retainer 31 against the upper end of shaft 15 by means of bolt 30 compresses the assembly of washers 28 against the upper surface of inner race 18 of bearing assembly 12. This places a downward force on ball bearings 26 in raceway 24, placing a corresponding downward force on outer race 20 of bearing assembly 12. This downward force on outer race 20 is applied by lip 22 to roller 11, which places a corresponding downward force on lip 23 of outer race 21 of bearing assembly 13. This force on outer race 23 is transferred by the ball bearings 26 in raceway 25 to inner race 19 of bearing assembly 13 and finally via washer 27 to base 16. Accordingly, the number of washers 28 between retainer 31 and inner race 18 of bearing assembly 12 determines the amount of this force, which is the preload within assembly 10. As can be seen from an inspection of FIG. 2, this force causes a deflection of inner races 18 and 19 relative to outer races 20 and 21, respectively, to eliminate the objectionable characteristics discussed previously which would exist in assembly 10 in the absence of a suitable preload.

According to the present invention, assembly 10 is modified so as to provide a rotatable element between two non-rotatable elements within the preload path. This is achieved, most readily, by including two special washers 41 and 42 in assembly 10, instead of several identical washers 28. Washers 41 and 42 are located in the preload path and are clamped together by the preload force. That is, washer 41 has an inside diameter which is greater than the outside diameter of shaft 15 so that it is rotatable relative thereto. Furthermore, the outside diameter of washer 41 is greater than the outside diameter of retainer 31 and washer 42 so that its outer edge can be engaged without engaging retainer 31 or washer 42. Preferably, the outer edge of washer 41 is hexagonal so that it may be engaged by a conventional socket 43 attachable to a wrench, as known to those skilled in the art.

Washer 42 must be axially moveable on shaft 15 but non-rotatable relative thereto. This is readily achieved by cutting one or more grooves 44 in shaft 15, providing washer 42 with an inside diameter which is greater than the outside diameter of shaft 15, and by providing washer 42 with one or more radially inwardly extending tongues 45 which extend into grooves 44.

Assembly of washers 28, 41, and 42 and retainer 31 is obvious from an inspection of FIGS. 1 and 2. After washer 28 is positioned over shaft 15, washer 42 is positioned thereabove, with tongues 45 extending into grooves 44. Washer 41 is then positioned over shaft 15 and bolt 30 used to secure retainer 31 to shaft 15. It is the combination of washers 28, 41 and 42 which applies the preload to bearing assemblies 12 and 13 when retainer 31 is secured to shaft 15.

According to the present invention, the bearing preload force determines the friction between washers 42 and 41 and retainer 31 and, therefore, the torque necessary to rotate washer 41 between the non-rotatable upper and lower surfaces of washer 42 and retainer 31, respectively. An external tool, not shown, may be used to make the necessary measurement. Such tool consists of a conventional torque measuring device such as torque watch or torque wrench to which is connected socket 43. Socket 43 engages the hexagonal outer edge of washer 41 whereupon continuous rotation of the torque measuring device rotates washer 41 relative to washer 42 and retainer 31. The measured dynamic torque is directly proportional to the dynamic friction between these elements which is also directly proportional to the bearing preload.

Figure 4:
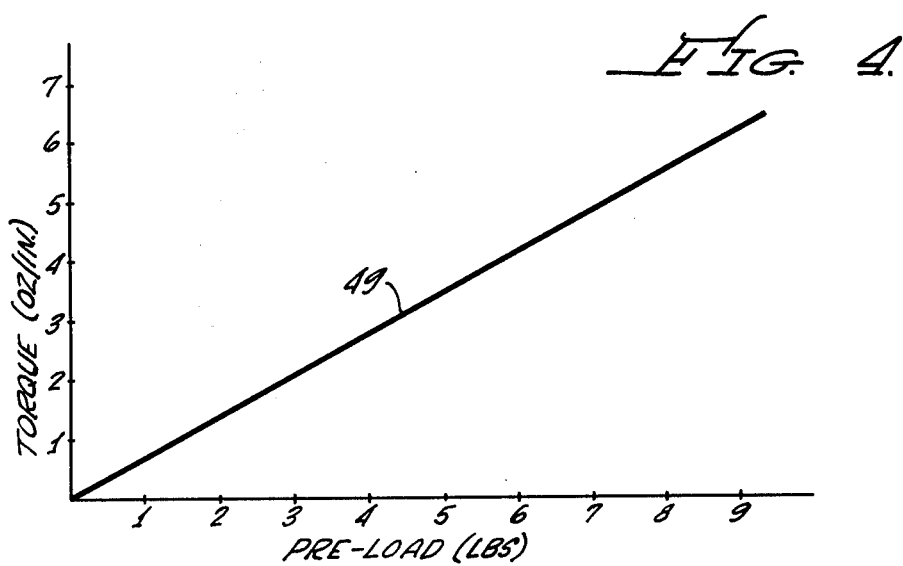
FIG. 4 is a graph derivable from the calibration procedure shown in FIG. 3.
Figure 3:
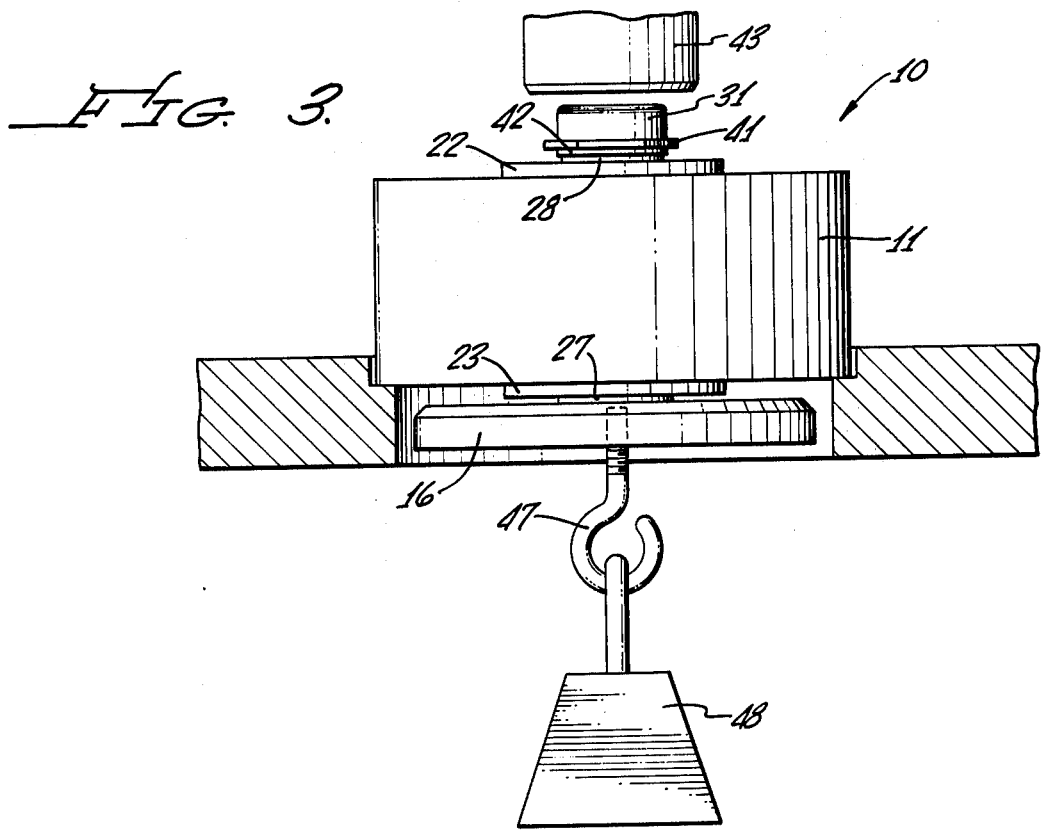
FIG. 3 is a side elevation view of the rolling element and bearing assembly of FIGS. 1 and 2, showing one calibration technique for determining bearing preload.

There are a variety of methods for determining the exact amount of the bearing preload from the measured torque. The first and apparently most desirable is to experimentally determine a conversion constant by measuring the friction torque using known clamping forces. This method is shown in FIG. 3 and the result thereof is plotted in FIG. 4. For example, assembly 10 may be assembled so that zero torque is required to rotate washer 41, the condition which would exist with a preload of zero pounds. Assembly 10 may then be positioned, as shown in FIG. 3, so that roller 11 is supported and base 16 is suspended. A hook 47 or other member may be secured to base 16 to permit the suspension therefrom of a known weight 48. If, for example, weight 48 weighs one pound, its weight is transferred by hook 47 to base 16 and shaft 15 to retainer 31 which is pulled downwardly, putting a preload on washers 41, 42, and 28 and bearing assembly 12 of exactly one pound. The torque necessary to rotate washer 41 may then be measured and plotted, as shown in FIG. 4.

The above step may then be repeated with different weights 48 over a range of possible compressional loads to establish a relationship between torque and compressional load. Experimental tests have shown a remarkably linear relationship between dynamic torque and preload, as shown by curve 49 in FIG. 4. In any event, curve 49 establishes the relationship between measured torque and compressional load.

With such an established relationship between torque and compressional load, assembly 10 may be manufactured with an appropriate number of washers 28 and the torque necessary to rotate washer 41 measured using a torque measuring device. From curve 49, this measured torque can be converted to preload. If the preload is greater or less than that desired, bolt 30 may be removed, permitting removal of retainer 31 and washers 41 and 42 and one or more washers 28 added or subtracted from shaft 15, depending upon whether the preload is to be increased or decreased. Thereafter, washers 41 and 42 and retainer 31 would be replaced, bolt 30 engaged, and the procedure repeated until the desired preload is achieved.

Another method for determining preload from the measured friction would be to calculate a conversion constant from the coefficent of dynamic friction of the materials of washers 41 and 42 and retainer 31 and the average radius of the friction surfaces. However, this method would be less desirable than the experimental method described above with regard to FIGS. 3 and 4.

According to the embodiment of the invention shown in FIGS. 1 and 2, only two special washers, namely washers 41 and 42, are used with washer 42 providing one non-rotatable element. Alternatively, a third washer identical to washer 42 could be located between washer 41 and retainer 31. This would make the friction measurement independent of the material of retainer 31 and would allow more flexibility in the design of assembly 10.

While the invention has been described in connection with a roller 11 supported by bearing assemblies 12 and 13, it is obvious that it is certainly adaptable to applications other than those measuring preloads within bearing assemblies. A set of washers 41 and 42 placed under a bolt head could be used to measure the load within a bolt. Any application where occasional measurements are required of loads within an assembly could be served by the present invention. The accuracy of these occasional measurements would, of course, be dependent on the absence of contamination or material degradation that might cause changes in coefficients of friction since the initial calibration measurements.

It can therefore be seen that according to the present invention, there is provided a method and means for measuring preloads in assembled mechanisms which solves the problems discussed hereinbefore. The present method and means is not only simple and accurate, but permits the measurement of a large range of preloads within an assembly of clamped elements, such as a bearing system. With the present method and means, the preload can be measured not only during, but after assembly since washer 41 is conveniently available for engagement by socket 43 and the torque measuring tool connected thereto.

With the present invention, low rate springs in the preload path are not required and the preload can be readily changed once the parts are manufactured. All that is required, in the embodiment of the invention shown in FIGS. 1 and 2, is the addition or subtraction of one or more washers 28.

The preload measurement may be made without unloading or disturbing the preload and may be made while the bearing system is in operation or being subjected to various environments. Furthermore, the preload measurement requires a minimum of operator skill compared to previous measurement techniques.

Obviously, the present preload sensing technique measures the load between inner race 18 of bearing assembly 12 and retainer 31. Therefore, any friction between race 18 and shaft 15 can cause a difference between the measured load and the actual bearing load. While this potential problem requires recognition, many solutions are readily available, such as the use of a freely sliding fit between inner race 18 and shaft 15. If necessary, custom fitting each shaft 15 to inner race 18 can provide a sliding fit without introducing significant radial play in bearing assembly 12. If it is further necessary to insure the absence of rotation between race 18 and shaft 15, race 18 could be keyed to shaft 15 in the same manner as washer 42 is keyed thereto.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. Means for determining the amount of compressional load in an assembly of clamped elements comprising:
   a rotatable element positioned between two non-rotatable elements within said assembly, the relationship between the surface friction between said rotatable element and said two non-rotatable elements and compressional load being known whereby the torque necessary to rotate said rotatable element is directly proportional to said compressional load.

2. Means according to claim 1, wherein said rotatable element comprises a disc-shaped member, the outer edge thereof including a plurality of segments for engaging apparatus for rotating same.

3. Means according to claim 2, further comprising:
   torque measuring means for engaging said rotatable element and for providing a measurement of the torque necessary to rotate same.

4. Means for determining the amount of compressional load in an assembly of clamped elements comprising:
   a rotatable element positioned between two non-rotatable elements within said assembly, the relationship between the torque necessary to rotate said rotatable element between said non-rotatable elements and compressional load being known whereby the torque necessary to rotate said rotatable element is directly proportional to said compressional load.

5. Means according to claim 4, wherein said rotatable element comprises a disc-shaped member, the outer edge thereof including a plurality of segments for engaging apparatus for rotating same.

6. Means according to claim 5, further comprising:
   torque measuring means for engaging said rotatable element and for providing a measurement of the torque necessary to rotate same.

7. A method for determining the amount of compressional load in an assembly of clamped elements comprising the steps of:
   positioning a rotatable element between two non-rotatable elements, the relationship between the torque necessary to rotate said rotatable element between said non-rotatable elements and compressional load being known;
   measuring the torque necessary to continuously rotate said rotatable element; and
   converting said measured torque to compressional load.

8. A method according to claim 7, wherein said converting step comprises the steps of:
   measuring the torque necessary to rotate said rotatable element with a known compressional load;
   repeating the above step over a range of possible compressional loads to establish said relationship between torque and compressional load; and
   comparing said measured torque with said established relationship.

9. A method for determining the amount of compressional load in an assembly of clamped elements comprising the steps of:
   positioning a rotatable element between two non-rotatable elements, the relationship between the surface friction between said rotatable element and said two non-rotatable elements and compressional load being known;
   measuring the surface friction between said rotatable element and said non-rotatable elements; and
   comparing said measured surface friction with said known relationship.

10. A method according to claim 9, wherein said surface friction measuring step comprises the steps of:
    rotating said rotatable element between said non-rotatable elements; and
    measuring the torque necessary to rotate said rotatable element.

11. A method according to claim 10, further comprising the steps of:
    measuring the torque necessary to rotate said rotatable element with a known compressional load;
    repeating the above step over a range of possible compressional loads to establish a relationship between torque and compressional load; and wherein said comparing step comprises the step of:
    comparing said measured torque with said established relationship.

* * * * *